United States Patent
Fu et al.

(10) Patent No.: US 9,235,089 B2
(45) Date of Patent: Jan. 12, 2016

(54) LIQUID CRYSTAL DISPLAY SCREEN HAVING CARBON NANOTUBES

(75) Inventors: Wei-Qi Fu, Beijing (CN); Liang Liu, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 541 days.

(21) Appl. No.: 12/313,393

(22) Filed: Nov. 20, 2008

(65) Prior Publication Data

US 2009/0225264 A1    Sep. 10, 2009

(30) Foreign Application Priority Data

Mar. 7, 2008  (CN) .......................... 2008 1 0065785

(51) Int. Cl.
*G02F 1/1343* (2006.01)
*B82Y 20/00* (2011.01)
*G02F 1/1337* (2006.01)

(52) U.S. Cl.
CPC ............ *G02F 1/13439* (2013.01); *B82Y 20/00* (2013.01); *G02F 1/133711* (2013.01); *G02F 2001/133765* (2013.01); *G02F 2001/133796* (2013.01); *G02F 2202/36* (2013.01); *Y10T 428/1005* (2015.01)

(58) Field of Classification Search
USPC ....................................................... 349/128
See application file for complete search history.

(56) References Cited

U.S. PATENT DOCUMENTS

| 7,045,108 | B2 | 5/2006 | Jiang et al. | |
| 7,794,639 | B2 | 9/2010 | Huang et al. | |
| 2003/0214475 | A1* | 11/2003 | Izumi et al. | 345/87 |
| 2004/0047038 | A1* | 3/2004 | Jiang et al. | 359/486 |

(Continued)

FOREIGN PATENT DOCUMENTS

| CN | 1483667 A | 3/2004 |
| CN | 1781034 | 5/2006 |

(Continued)

OTHER PUBLICATIONS

Fan et al., Explorations on growth mechanism, controlled synthesis and applications of carbon nanotubes, Physics, vol. 35, No. 5, pp. 376-381, (2006).

(Continued)

*Primary Examiner* — Lauren Nguyen
(74) *Attorney, Agent, or Firm* — Novak Druce Connolly Bove + Quigg LLP

(57) ABSTRACT

A liquid crystal display screen includes a first substrate, a first alignment layer, a liquid crystal layer, a second alignment layer, and a second substrate opposite to the first substrate. The liquid crystal layer is sandwiched between the first substrate and the second substrate. The first alignment layer and the second alignment layer are respectively disposed on the first substrate and the second substrate, and face the liquid crystal layer. The first alignment layer and the second alignment layer respectively include a plurality of parallel first grooves and second grooves perpendicular to the first grooves formed thereon facing the liquid crystal layer. Furthermore, at least one of the alignment layers includes a carbon nanotube layer and a fixing layer disposed thereon facing the liquid crystal layer. The carbon nanotube layer includes at least one carbon nanotube film pulled out from an array of carbon nanotubes.

1 Claim, 7 Drawing Sheets

(56) References Cited

U.S. PATENT DOCUMENTS

| | | |
|---|---|---|
| 2004/0053780 A1* | 3/2004 | Jiang et al. ............ 502/182 |
| 2005/0007648 A1 | 1/2005 | Wu et al. |
| 2005/0184642 A1* | 8/2005 | Oh et al. ............ 313/495 |
| 2006/0113510 A1* | 6/2006 | Luo et al. ............ 252/500 |
| 2007/0052670 A1* | 3/2007 | Lee et al. ............ 345/107 |
| 2007/0115413 A1* | 5/2007 | Liu et al. ............ 349/123 |
| 2007/0116916 A1 | 5/2007 | Ito et al. |
| 2007/0296897 A1* | 12/2007 | Liu et al. ............ 349/123 |
| 2009/0073363 A1* | 3/2009 | Fu et al. ............ 349/128 |
| 2009/0272935 A1 | 11/2009 | Hata et al. |

FOREIGN PATENT DOCUMENTS

| | | |
|---|---|---|
| CN | 1955819 A | 5/2007 |
| CN | 1979948 | 6/2007 |
| JP | 2004-102217 | 4/2004 |
| JP | 2004-107196 | 4/2004 |
| JP | 2004-348121 | 12/2004 |
| JP | 2006-201575 | 8/2006 |
| JP | 2007-122057 | 5/2007 |
| JP | 2007-182352 | 7/2007 |
| JP | 2007-314776 | 12/2007 |
| JP | 2008-3606 | 1/2008 |
| TW | 200417510 | 3/1992 |
| TW | 200941094 | 3/1997 |
| TW | I228605 | 3/2005 |
| TW | 255487 | 5/2006 |
| TW | I255487 | 5/2006 |
| TW | 200621631 | 7/2006 |
| TW | 200938917 | 9/2009 |

OTHER PUBLICATIONS

Xiang lin Liu, Physics New Knowledge. Physics bimonthly journal, vol. 27, No. 5, pp. 720-721, (2005).

* cited by examiner

LIQUID CRYSTAL DISPLAY SCREEN HAVING CARBON NANOTUBES

RELATED APPLICATIONS

This application is related to commonly-assigned applications entitled "LIQUID CRYSTAL DISPLAY SCREEN", filed on 2008 Nov. 20, (application Ser. No. 12/313,452); "LIQUID CRYSTAL DISPLAY SCREEN", filed on 2008 Nov. 20, (application Ser. No. 12/313,394); "METHOD FOR MAKING LIQUID CRYSTAL DISPLAY SCREEN", filed on 2008 Nov. 11, (application Ser. No. 12/313,450); "LIQUID CRYSTAL DISPLAY SCREEN", filed on 2008 Nov. 20, (application Ser. No. 12/313,415); "LIQUID CRYSTAL DISPLAY SCREEN", filed on 2008 Nov. 20, (application Ser. No. 12/313,440); and "METHOD FOR MAKING LIQUID CRYSTAL DISPLAY SCREEN", filed on 2008 Nov. 20, (application Ser. No. 12/313,414). The disclosures of the above-identified applications are incorporated herein by reference.

BACKGROUND

1. Field of the Invention

The present invention relates to liquid crystal display screens and, particularly, to a carbon-nanotube-based liquid crystal display screen.

2. Discussion of Related Art

Referring to FIG. 7, a conventional liquid crystal display screen 100, according to the prior art, for a liquid crystal display (LCD) generally includes a first substrate 104, a second substrate 112, and a liquid crystal layer 118. The first substrate 104 is disposed parallel to the second substrate 112. The liquid crystal layer 118 is located between the first substrate 104 and the second substrate 112. A first transparent electrode layer 106 and a first alignment layer 108 are formed in that order on an inner surface of the first substrate 104 that faces toward the liquid crystal layer 118. A first polarizer 102 is formed on an outer surface of the first substrate 104 that faces away from the liquid crystal layer 118. A second transparent electrode layer 114 and a second alignment layer 116 are formed in that order on an inner surface of the second substrate 112 that faces toward the liquid crystal layer 118. A second polarizer 110 is formed on an outer surface of the second substrate 112 that faces away from the liquid crystal layer 118.

The quality and performance of the alignment layers 108, 116 are key factors that determine the display quality of the liquid crystal display screen 100. A high quality liquid crystal display screen demands steady and uniform arrangement of liquid crystal molecules 1182 of the liquid crystal layer 118. This is achieved in part by correct arrangement of the liquid crystal molecules 1182 at the alignment layers 108, 116. Materials to make the alignment layers 108, 116 are typically selected from the group comprising of polystyrene, polystyrene derivative, polyimide, polyvinyl alcohol, epoxy resin, polyamine resin, and polysiloxane. The selected material is manufactured into a preform of each alignment layer 108, 116. The preform is then treated by one method selected from the group comprising of rubbing, incline silicon oxide evaporation, and atomic beam alignment micro-treatment. Thereby, grooves are formed on the treated surface of the preform, and the alignment layer 108, 116 is obtained. The grooves affect the arrangement and orientations of the liquid crystal molecules 1182 thereat.

In the liquid crystal display screen 100, the liquid crystal molecules 1182 are cigar-shaped. A plurality of parallel first grooves 1082 is formed at an inner surface of the first alignment layer 108. A plurality of parallel second grooves 1162 is formed at an inner surface of the second alignment layer 116. A direction of alignment of each of the first grooves 1082 is perpendicular to a direction of alignment of each of the second grooves 1162. The grooves 1082, 1162 function so as to align the orientation of the liquid crystal molecules 1182 thereat. In particular, the liquid crystal molecules 1182 adjacent to the alignment layers 108, 116 are aligned parallel to the grooves 1082, 1162 respectively. When the grooves 1082 and 1162 are at right angles and the substrates 104 and 112 are spaced an appropriate distance from each other, the liquid crystal molecules 1182 can automatically twist progressively over a range of 90 degrees from the top of the liquid crystal layer 118 to the bottom of the liquid crystal layer 118.

The polarizers 102 and 110 and the transparent electrode layers 106 and 114 play important roles in the liquid crystal display screen 100. However, the polarizers 102 and 110 and the transparent electrode layers 106 and 114 may make the liquid crystal display screen 100 unduly thick, and may reduce the transparency of the liquid crystal display screen 100. Moreover, the polarizers 102 and 110 and the transparent electrode layers 106 and 114 typically increase the cost of manufacturing the liquid crystal display screen 100.

What is needed, therefore, is to provide a thin liquid crystal display screen with a simple structure and an excellent arrangement of quality liquid crystal molecules.

BRIEF DESCRIPTION OF THE DRAWINGS

Many aspects of the present liquid crystal display screen can be better understood with reference to the following drawings. The components in the drawings are not necessarily drawn to scale, the emphasis instead being placed upon clearly illustrating the principles of the present liquid crystal display screen.

Figure 1:
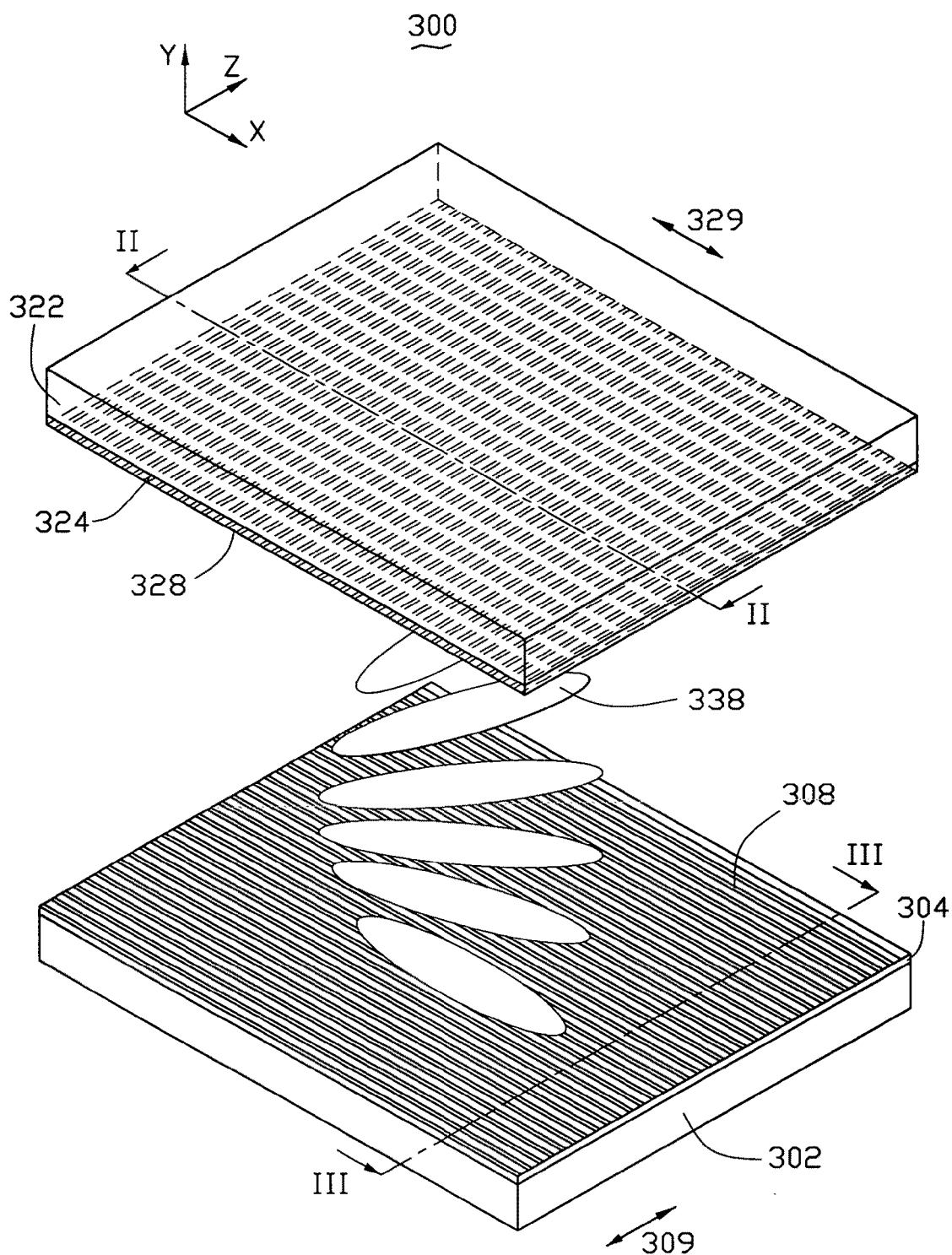
FIG. 1 is a schematic, isometric view of a liquid crystal display screen in accordance with one embodiment of the present invention.

Corresponding reference characters indicate corresponding parts throughout the several views. The exemplifications set out herein illustrate at least one embodiment of the present liquid crystal display screen, in at least one form, and such exemplifications are not to be construed as limiting the scope of the invention in any manner.

DETAILED DESCRIPTION OF EXEMPLARY EMBODIMENTS

References will now be made to the drawings to describe, in detail, various embodiments of the present liquid crystal display screen.

Figure 2:
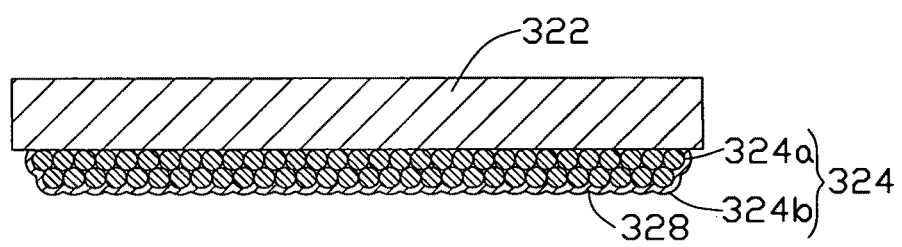
FIG. 2 is a cross-sectional schematic view of the liquid crystal display screen of the present embodiment, taken along a line II-II of FIG. 1.
Figure 3:
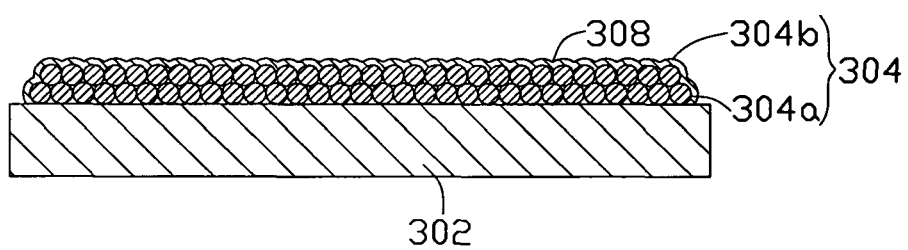
FIG. 3 is a cross-sectional schematic view of the liquid crystal display screen of the present embodiment, taken along a line III-III of FIG. 1.

Referring to FIGS. 1, 2, and 3, a liquid crystal display screen 300 includes a first substrate 302, a first alignment layer 304, a liquid crystal layer 338, a second alignment layer 324, and a second substrate 322. The first substrate 302 is opposite to the second substrate 322. The liquid crystal layer 338 is sandwiched between the first substrate 302 and the second substrate 322. The first alignment layer 304 is disposed on the first substrate 302 adjacent to the liquid crystal layer 338. The first alignment layer 304 includes a plurality of parallel first grooves 308 facing the liquid crystal layer 338. The second alignment layer 324 is disposed on the second substrate 322 adjacent to the liquid crystal layer 338. The second alignment layer 324 includes a plurality of parallel second grooves 328 facing the liquid crystal layer 338. An alignment direction of the first grooves 308 is perpendicular to an alignment direction of the second grooves 328.

The material of the first substrate 302 and the second substrate 322 can be selected from the group comprising of glass, quartz, diamond, and plastics. In the present embodiment, the first substrate 302 and the second substrate 322 are made of flexible materials, such as cellulose triacetate (CTA). Based on user-specific needs, the first substrate 302 and the second substrate 322 can be respectively made of different materials selected from the above-described materials.

The liquid crystal layer 338 includes a plurality of cigar-shaped liquid crystal molecules. The liquid crystal layer 338 can also be made of other liquid crystal materials, which are generally used in the present technology.

The first alignment layer 304 includes a first carbon nanotube layer 304a and a first fixing layer 304b. The first fixing layer 304b is disposed on the first carbon nanotube layer 304a facing the liquid crystal layer 338. The first carbon nanotube layer 304a comprises at least one carbon nanotube film or two or more stacked carbon nanotube films, two or more coplanar carbon nanotube films, or multiple layers of coplanar films. Adjacent carbon nanotube films connect to each other by van der Waals attractive force therebetween. A thickness of the carbon nanotube film approximately ranges from 0.5 nanometers to 100 micrometers. Each carbon nanotube film includes a plurality of carbon nanotube segments joined successively end-to-end by van der Waals attractive force therebetween. Each carbon nanotabe segments includes a plurality of carbon nanotubes closely arranged and in parallel to each other. The carbon nanotubes in the segments have substantially the same length and are arranged substantially in the same direction. The aligned direction of the carbon nanotubes in any two adjacent carbon nanotube films form an angle $\alpha$, where $0 \leq \alpha \leq 90°$. The carbon nanotubes at least in the exposed layer are arranged in parallel define a plurality of parallel gaps, which are used as the first grooves 308 and/or the second grooves 328 to align the liquid crystal molecules. It is to be understood that there can be some variation in the first carbon nanotube layer 304a.

In the following description, unless the context indicates otherwise, it will be assumed that each carbon nanotube layer is formed of a single carbon nanotube film.

The carbon nanotubes in the carbon nanotube film can be single-walled carbon nanotubes, double-walled carbon nanotubes, or multi-walled carbon nanotubes. Diameters of the single-walled carbon nanotubes are in the approximate range from 0.5 to 10 nanometers. Diameters of the double-walled carbon nanotubes are in the approximate range from 1 to 50 nanometers. Diameters of the multi-walled carbon nanotubes are in the approximate range from 1.5 to 50 nanometers.

The second alignment layer 324 can be a conventional alignment layer such as a polyamide layer or a carbon nanotube layer similar to the first alignment layer 304. In the present embodiment, the second alignment layer 324 is a carbon nanotube layer and a given fixing layer. In the present embodiment, the first alignment layer 304 includes a first carbon nanotube layer 304a and a first fixing layer 304b; and the second alignment layer 324 includes a second carbon nanotube layer 324a and a second fixing layer 324b. Due to the carbon nanotube layers 304a and 324a having a plurality of parallel and uniform gaps, when the first fixing layer 304b and the second fixing layer 324b are correspondingly formed on the first carbon nanotube layer 304a and the second carbon nanotube layer 324a, the first grooves 308 and the second grooves 328 are respectively formed on surfaces of the first fixing layer 304b and the second fixing layer 324b.

The materials of the fixing layers 304b and 324b are selected from diamonds, silicon nitrogen, hydride of random silicon, silicon carbon, silicon dioxide, aluminum oxide, tin oxide, cerium oxide, zinc titanate, and indium titanate. The fixing layers 304b and 324b can be fabricated by means of evaporating, sputtering, or plasma enhanced chemical vapor deposition. Also, the materials of the fixing layers 304b and 324b are selected from polyethylene ethanol, polyamide, polymethyl methacrylate, and polycarbonate. The fixing layers 304b and 324b are sprayed on the first carbon nanotube layer 304a and the second carbon nanotube layer 324a. A thickness of the fixing layers is in an approximate range from 20 nanometers to 2 micrometers.

Figure 4:
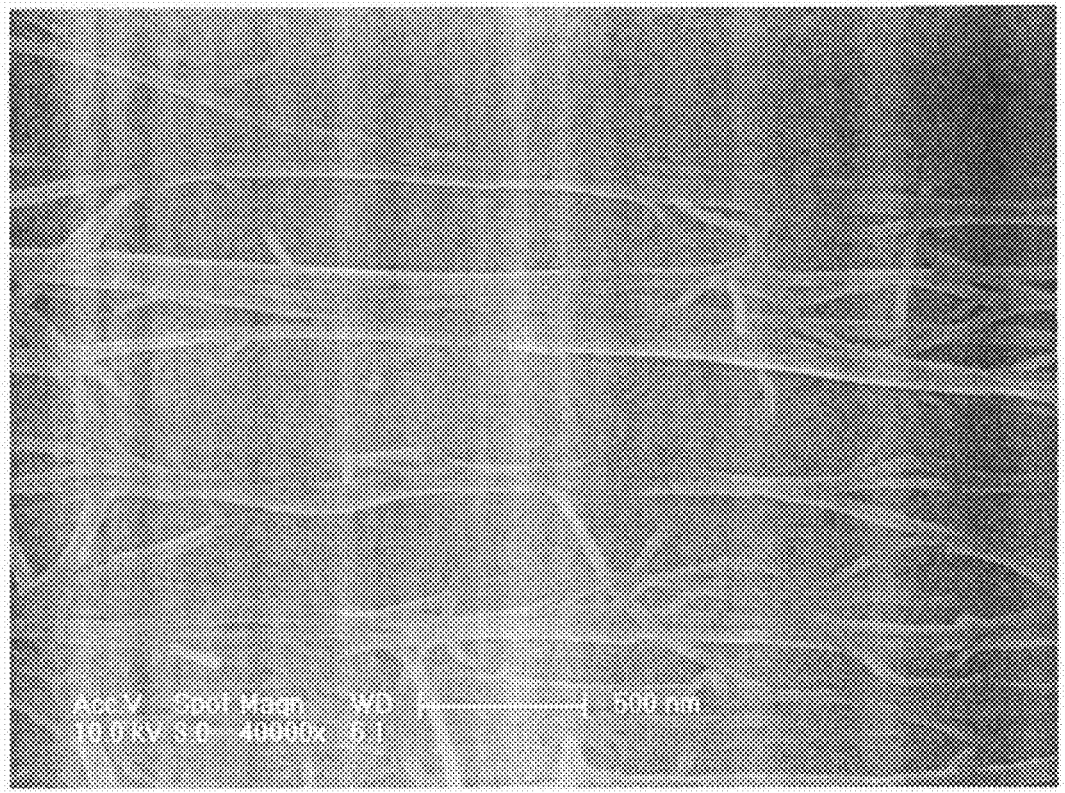
FIG. 4 shows a Scanning Electron Microscope (SEM) image of a carbon nanotube film covered with a fixing layer in the liquid crystal display screen of the present embodiment.

Referring to FIG. 4, a plurality of grooves forms on the alignment layer, and these grooves are used to align the liquid molecules. The alignment layer includes a carbon nanotube layer and a fixing layer. The carbon nanotube layer includes a plurality of parallel carbon nanotubes. The fixing layer is made of silicon dioxide and has a thickness of 20 nanometers.

In order to ensure the first grooves 308 are perpendicular to the second grooves 328, the carbon nanotubes in the first alignment layer 304 are perpendicular to the carbon nanotubes arranged direction in second alignment layer 324. Specifically, the carbon nanotubes in the first alignment layer 304 are each aligned parallel to the X-axis, and the carbon nanotubes in the second alignment layer 324 are each aligned parallel to the Z-axis as defined by the figures. A thickness of each of the first alignment layer 304 and the second alignment layer 324 is in a range from 20 nanometers to 5 micrometers.

Since the carbon nanotube layer has a high tensile strentgh, if the first substrate 302 and the second substrate 322 are made of flexible materials, the liquid crystal display screen 300 will be flexible. Moreover, the carbon nanotube layer has a plurality of carbon nanotubes, thus the carbon nanotube layer has good electrical conductivity. Thus, each carbon nanotube layer can be used to conduct electricity and thereby replace a conventional transparent electrode layer, i.e., the carbon nanotube layer can act as both an alignment and an electrode layer. This simplifies the structure and reduces the thickness of the liquid crystal display screen 300, and enhances the efficiency of usage of an associated backlight.

Furthermore, by overlapping a fixing layer on the carbon nanotube layer, this prevents the carbon nanotube layer of the alignment layer from failing when the liquid crystal layer is applied.

Because the carbon nanotubes in each carbon nanotube layer are arranged in parallel, the carbon nanotube layer has a light polarization characteristic, and thus, can be used to replace a conventional polarizer. Nevertheless, in order to obtain a better polarization effect, at least one polarizer can be disposed on a surface of the first substrate 302 that faces away from the liquid crystal layer 338, and/or on a surface of the second substrate 322 that faces away from the liquid crystal layer 338.

Figure 5:
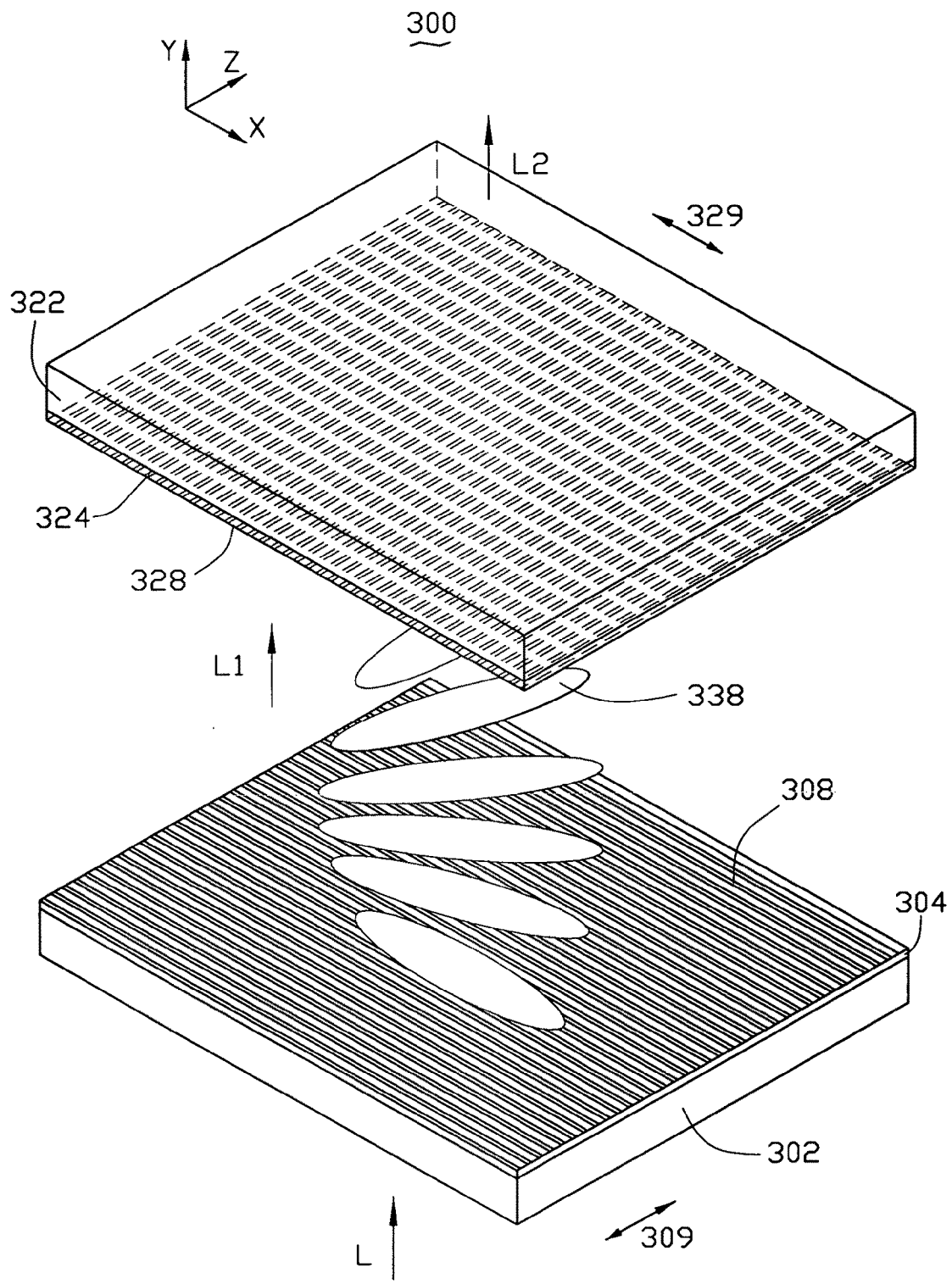
FIG. 5 is similar to FIG. 1 showing the liquid crystal display screen in a light-transmitting state with single film alignment layers.

Referring to FIG. 5, when no voltage is applied to the alignment layers 304 and 324, the arrangement of the liquid crystal molecules is in accordance with the alignment directions of the alignment layers 304 and 324. In this embodiment, the alignment directions of the alignment layers 304 and 324 are at right angles, so the liquid crystal molecules can automatically orient so that they turn a total of 90 degrees from a top of the liquid crystal layer 338 to a bottom of the liquid crystal layer 338. When light L is shone upon the first alignment layer 304, because a transmission axis 309 of the first alignment layer 304 is along the direction of the z-axis, only polarization light L1 with a polarization direction parallel to the transmission axis 309 can pass through the first alignment layer 304. When the polarization, light L1 passes through the liquid crystal molecules, and because the liquid crystal molecules turn 90 degrees from bottom to top, the polarization direction of the polarization light L1 is also turned 90 degrees and becomes polarization light L2 which is parallel to the direction of the x-axis. The polarization light L2 passing through the liquid crystal molecules can pass through the second alignment layer 324 because a transmission axis 329 of the second alignment layer is along the direction of the x-axis. As a result, the liquid crystal display screen 300 transmits light.

Figure 6:
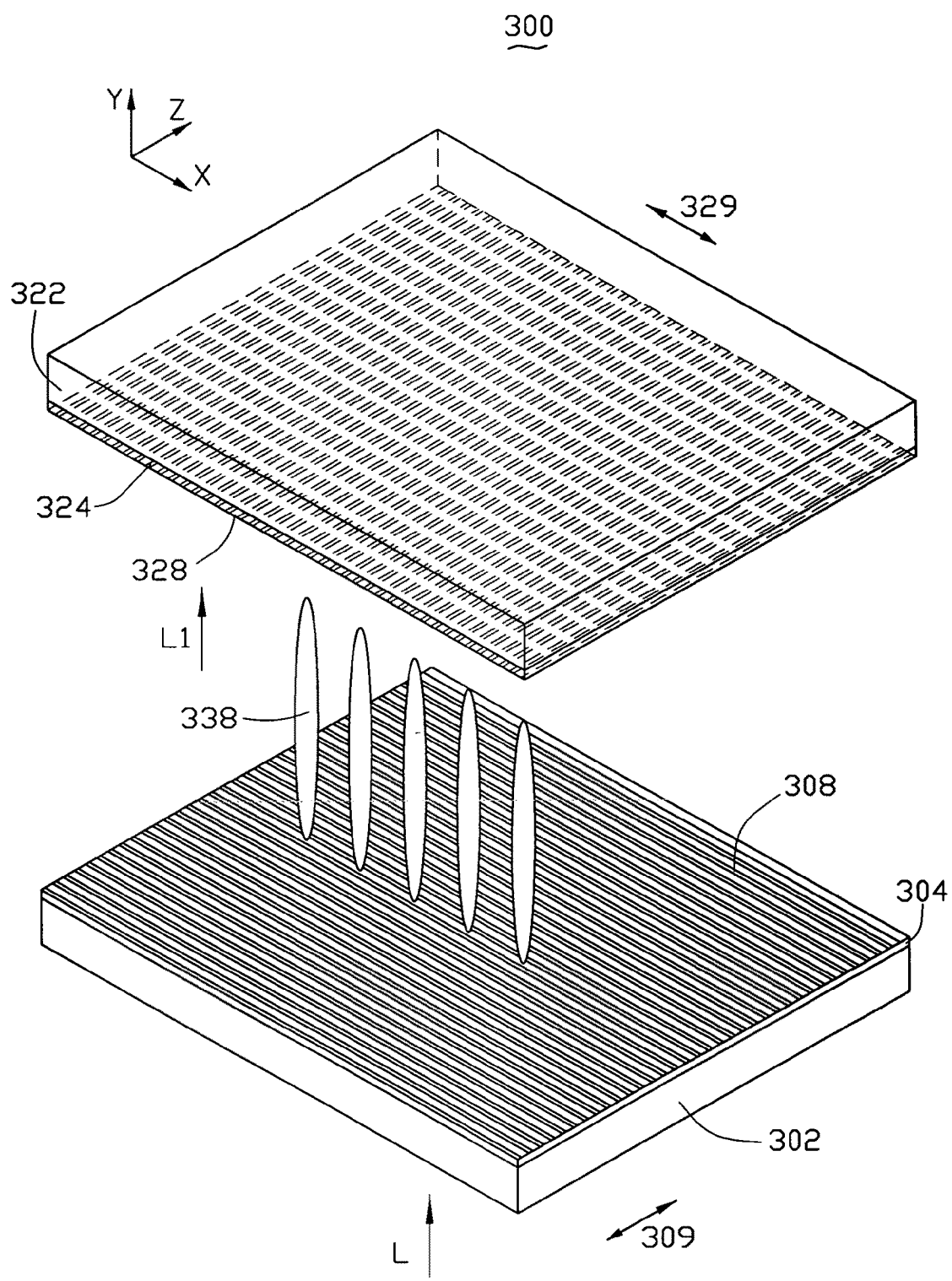
FIG. 6 is similar to FIG. 5, but showing the liquid crystal display screen in a light-blocking state.
Figure 7:
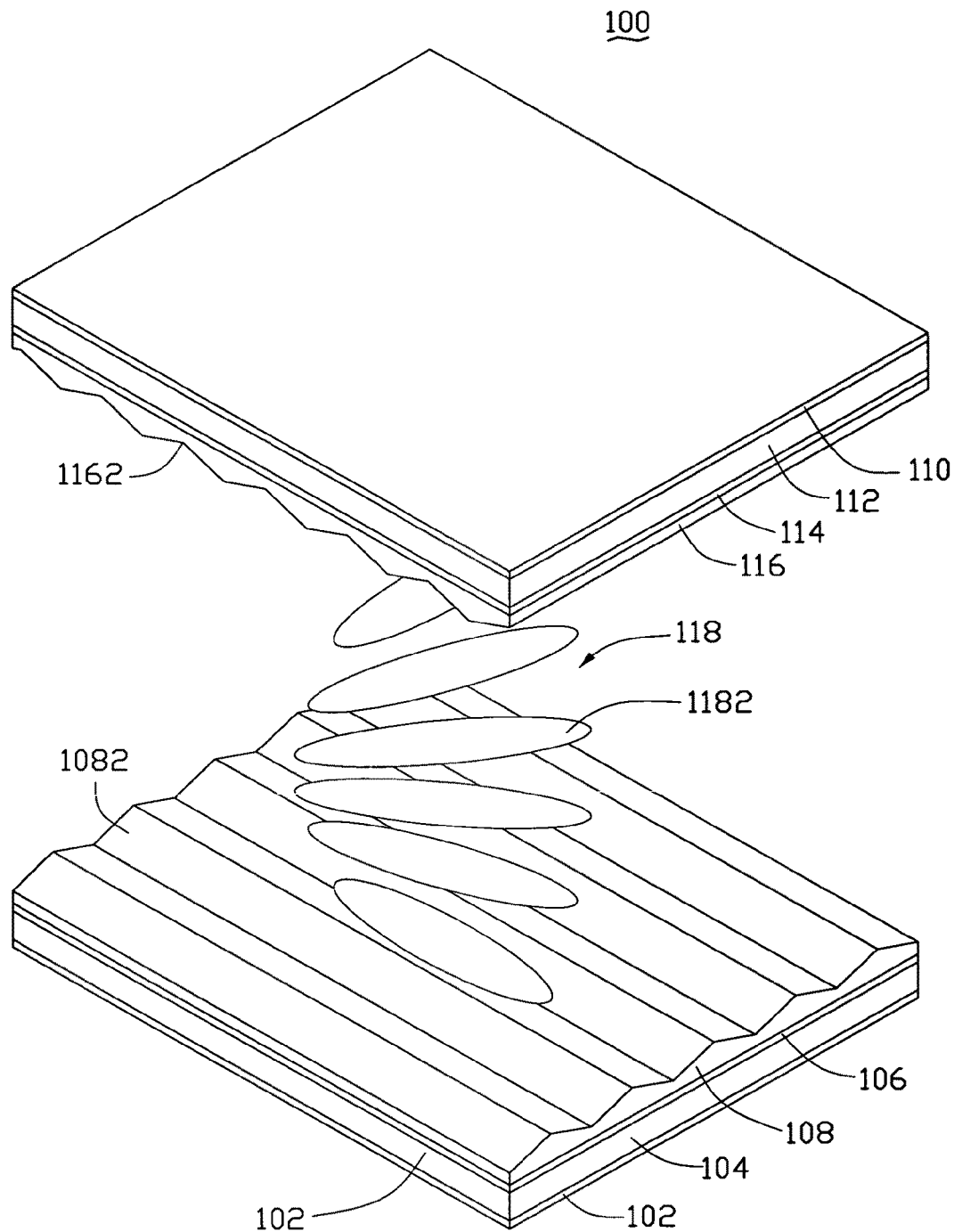
FIG. 7 is a schematic, isometric view of a conventional liquid crystal display screen according to the prior art.

Referring to FIG. 6, when a voltage is applied to the alignment layers 304 and 324, an electrical field with a direction perpendicular to the alignment layers 304 and 324 is formed. Under the influence of the electrical field, the liquid crystal molecules orient to become parallel to the electrical field. Accordingly, the polarization light L1 passing through the liquid crystal molecules keeps its polarization direction along the Z-axis and cannot pass through the second alignment layer 324. As a result, the liquid crystal display screen 300 blocks light.

The present liquid crystal display screen 300 has at least the following advantages. Firstly, each carbon nanotube layer has a plurality of carbon nanotubes and, thus, has good electrical conductivity. As a result, the carbon nanotube layer can be used to conduct electricity, and can replace the conventional transparent electrode layer, i.e., the carbon nanotube layer acting as both the alignment and electrode layers. This simplifies the structure of the liquid crystal display screen 300, reduces the thickness thereof, and enhances the efficiency of usage of an associated backlight. Secondly, the carbon nanotube film is achieved by the pulling out from an array of carbon nanotubes without other mechanical treatments, such as rubbing the film. Thus, the conventional art problem of electrostatic charge and dust contamination can be avoided, and the corresponding alignment layer 304, 324 has good quality. Thirdly, by overlapping a fixing layer on the carbon nanotube layer, this prevents the carbon nanotube layer of the alignment layer from failing when the carbon nanotube layer is in contact with the liquid crystal layer.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A liquid crystal display screen comprising:
a first insulating substrate;
a second insulating substrate opposite to the first insulating substrate;
a liquid crystal layer located between the first insulating substrate and the second insulating substrate;
a first alignment layer located on the first insulating substrate and comprising a first carbon nanotube film and a first fixing layer located thereon, wherein the first carbon nanotube film contacts with the first insulating substrate, the first carbon nanotube film comprises a plurality of first carbon nanotubes parallel to each other and joined end by end along a length direction of the plurality of first carbon nanotubes, the first fixing layer defines a plurality of first grooves parallel to the length direction of the plurality of first carbon nanotubes; the first carbon nanotube film comprises a plurality of carbon nanotube segments joined end by end by Waals attractive force therebetween; each of the plurality of carbon nanotube segments comprises a plurality of carbon nanotubes with substantially same length and arranged substantially in the same direction; the first alignment layer comprises two stacked first carbon nanotube films; wherein aligned directions of the plurality of carbon nanotubes in the two stacked first carbon nanotube films form an angle $\alpha$, where $\alpha=90°$; and
a second alignment layer located on the second insulating substrate and comprising a second carbon nanotube film and a second fixing layer located thereon, wherein the second carbon nanotube film contacts with the second insulating substrate, the second carbon nanotube film comprises a plurality of second carbon nanotubes parallel to each other and joined end by end along a length direction of the plurality of second carbon nanotubes, the second fixing layer defines a plurality of second grooves parallel to the length direction of the plurality of second carbon nanotubes, polarization elements of the liquid crystal display consist of the first carbon nanotube film and the second carbon nanotube film,
wherein materials of the first fixing layer and the second fixing layer are selected from the group consisting of diamonds, silicon nitrogen, hydride of random silicon, silicon carbon, silicon dioxide, aluminum oxide, tin oxide, cerium oxide, zinc titanate, and indium titanate.

* * * * *